Feb. 6, 1962 R. K. VAN VECHTEN ET AL 3,020,416

SIGNAL TRANSLATING DEVICE

Filed Jan. 21, 1960 3 Sheets-Sheet 1

INVENTORS.
RICHARD K. VAN VECHTEN
ROBERT T. ADAMS

BY Robert Lieber

ATTORNEY

INVENTORS.
RICHARD K. VAN VECHTEN
ROBERT T. ADAMS
BY Robert Lieber
ATTORNEY

Feb. 6, 1962 R. K. VAN VECHTEN ET AL 3,020,416

SIGNAL TRANSLATING DEVICE

Filed Jan. 21, 1960 3 Sheets-Sheet 3

INVENTORS.
RICHARD K. VAN VECHTEN
ROBERT T. ADAMS
BY Robert Lieber
ATTORNEY

United States Patent Office 3,020,416

Patented Feb. 6, 1962

3,020,416

SIGNAL TRANSLATING DEVICE

Richard K. Van Vechten, Clifton, and Robert T. Adams, Short Hills, N.J., assignors to International Telephone and Telegraph Corporation, Nutley, N.J., a corporation of Maryland Filed Jan. 21, 1960, Ser. No. 3,922
18 Claims. (Cl. 307—88)

This invention relates generally to signal translating devices, and particularly to scanning switches of the type wherein sequential connections between predetermined signal conductive channels are rhythmically effected.

Translating or switching devices of the general type under consideration are used, for example, in time division multiplexing systems, to transfer signals from a multiplicity of communication channels into a single communication channel, in an ordered time sequence which permits subsequent retrieval of the information signals at a multiplicity of remote channels. In the retrieval of such information signals, it is also customary to provide switching devices, of the general type under consideration, which distributively direct the signals to their appropriate receiving channels. The above mentioned transmission channels may also, in some instances, comprise cells in a signal storage array, which relinquish their contents in a predetermined time sequence, the contents thereafter being operated upon in serial fashion, and the resultant signals returned to the same or another storage array, in a similar predetermined time sequence. Other uses for devices of the type generally under consideration herein will be readily apparent upon consideration of the foregoing in conjunction with the following detailed disclosure and description.

A general problem related to distributive type switching mechanisms concerns limitations associated with both mechanical and electronic switches heretofore available. Mechanical switches used to perform a distributive function are generally limited due to their bulky nature and other undesirable effects, such as friction, which lead to unreliable operation. On the other hand, presently known electronic devices, such as ring counters having associated gates for each counting stage, are limited in that they require a continuous application of power, even when not transferring signals, and they also require an associated clock or timing source to distributively step a signal condition through the stages of the counter. In addition, electronic gates performing a distributive function cannot be used to scan or multiplex signal sources, and scanning gates likewise cannot be used for signal distribution.

Accordingly, it is an object of this invention to provide an improved signal translating device which avoids one or more of the aforementioned objections of prior distributive switching arrangements.

More specific objects of this invention include the provision of a signal translating device requiring no power during periods in which the device is not transferring signals; a translating device requiring no external timing after the initiation of a signal scanning or distribution cycle; a compact signal translating device requiring no moving parts for operation; and a bidirectional electronic signal translating device.

An important feature of this invention involves the use of a constrictive signal propagation element as a variable reluctance inductive coupling between spaced inductive elements, the variation in reluctance being associated with a propagating constrictive signal passing through the region adjacent at least one of the inductive elements.

These and other objects, features, and advantages of the present invention will be readily apparent upon consideration of the following detailed description taken in conjunction with the appended figures, wherein.

Figure 1:
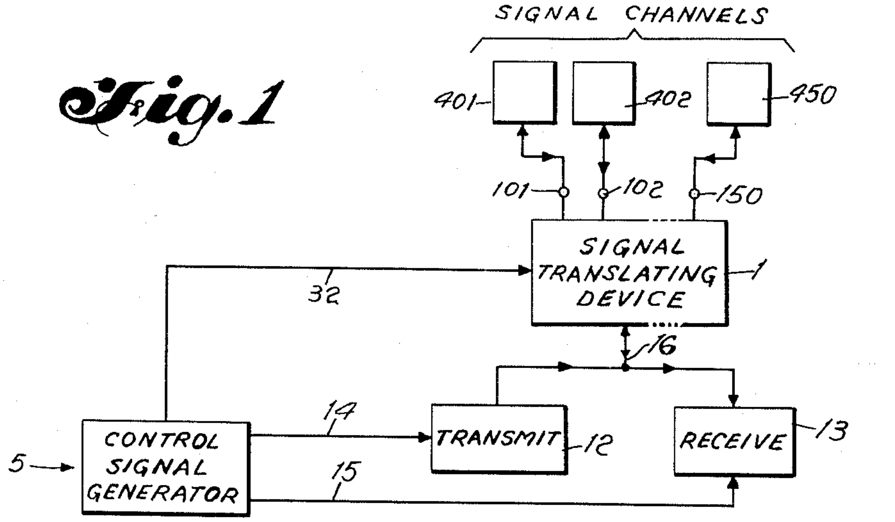
FIG. 1 is a generalized block diagram of a typical system utilizing the signal translating device of this invention.

Referring to FIG. 1, a generalized block diagram of a system operating in accordance with this invention includes a signal translating device 1, operative to sequentially couple signals bidirectionally between each signal terminal 101 to 150, and a signal terminal 16. Each sequential coupling cycle is initiated by a signal on conductor 32, this signal being generated by a control 5, which also provides mutually exclusive enabling signals on conductors 14 and 15, which respectively control the operation of a transmitting circuit 12, and a receiving circuit 13. The terminals 101 to 150 are connected to signal channels 401 to 450, respectively, which are selectively operative to transfer signals to the associated terminals, or to receive signals translated to the associated terminals by the device 1.

In one mode of operation, upon the occurrence of a suitable signal at conductor 14, transmitting circuit 12 provides signals which are entered into signal channel 16, which in turn is connected to the translating device 1. Prior to the energization of transmitting circuit 12, a pulse signal issuing onto conductor 32 initiates a scanning cycle causing the switching device 1 to sequentially establish inductive coupling connections between each of the signal terminals 101 and 150 and terminal 16. Hence, in this mode of operation, signals may be distributively inserted into the signal channels 401 to 450, from the transmission circuit 12 and its connecting terminal 16, through the device 1.

In the receiving mode of operation, a signal entered onto conductor 32 initiates a scanning cycle, and a signal is placed on conductor 15 activating receiving circuit 13, transmitting circuit 12 being disabled at this time. Accordingly, signals at terminals 101 to 150 will be sequentially scanned and serially coupled into the receiving circuit 13, each signal channel being coupled to receiver 13 for an equal period of time.

Figure 2:
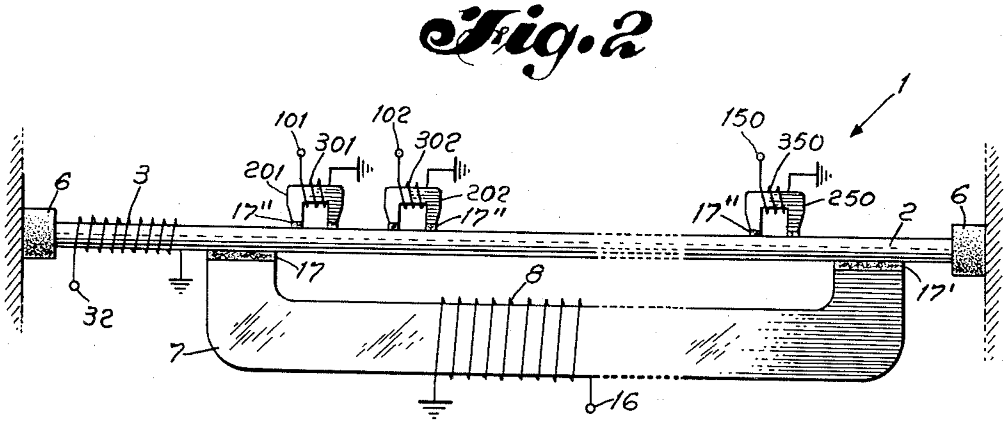
FIG. 2 is a view in elevation of one form of signal translating device operating in accordance with the principles of this invention.

In FIG. 2, one form of translating device 1, in accordance with this invention, includes a magnetostrictive signal propagation element 2, capable of propagating a pulse of constrictive deformation along its length. Such devices generally provide the function of delaying or retarding the circulation of a signal through a signal channel, and are therefore frequently termed magnetostrictive delay lines. Delay line 2 is comprised of a material such as annealed nickel which exhibits a distinct magnetic reluctance variation propagating in conjunction with a propagating constrictive pulse. Pulses, progagating along the delay line 2, are induced by means of a coil 3, excited by a signal on conductor 32 as described in connection with FIG. 1. Alternatively, constrictive pulses may be induced in delay line 2 by a suitably positioned piezoelectric transducer or other disturbing means. Damping members 6, comprised of a damping material, such as rubber, are provided for supporting the delay line 2, and also for absorbing energy propagating along the delay line so as to prevent reflection of such energy back into the propagating medium.

A magnetic member 7, having a low magnetic reluctance characteristic, is connected to the delay line 2 by means of a nondamping magnetically permeable connecting material such as steel wool, identified at 17 and 17'. The member 7, in conjunction with the delay line 2, thereby comprises a complete magnetic circuit for circulating magnetic flux. A coil 8, connected at one end thereof to terminal 16, and at the other end to a reference ground potential, is inductively coupled to the member 7. Inductive elements 201 to 250, having associated coils 301 to 350 with a common electrical termination at ground and individual signal terminals 101 to 150, are positioned along the delay line 2, in intimate relationship thereto, within the region in which the delay line comprises a portion of the aforementioned magnetic circuit including the delay line, the magnetic member 7, and the connecting material at 17 and 17'. Each inductive element 201 to 250, is comprised of a magnetically permeable material suitable for coupling the corresponding coils 301 to 350 to the delay line 2. Also, each inductive element 201 to 250 contacts delay line 2 through magnetically permeable, nondamping packings 17" of steel wool or other suitable material.

It has been discovered by this invention that when a magnetostrictive material, such as annealed nickel, is constrictively excited, the propagating pulse of magnetostriction, or constriction, has associated therewith a minute region of increased magnetic reluctance. If magnetic flux is linking the magnetostrictive material, the increase in reluctance associated with a constrictive pulse produces a decrease in flux in the region of the pulse. It has further been discovered by this invention that this decrease in flux concentration results in an increased flux concentration exterior to the magnetostrictive line sufficient to excite an inductive element located in intimate relationship to the peripheral region adjacent the pulse. Accordingly, it will be shown below that a pulse of magnetostriction introduced by means of the coil 3, or an equivalent disturbing source may be used to sequentially vary the inductive coupling between the coil 8 and each coil 301 to 350, as the pulse passes the region adjacent each corresponding inductive element 201 to 250.

Figure 3:
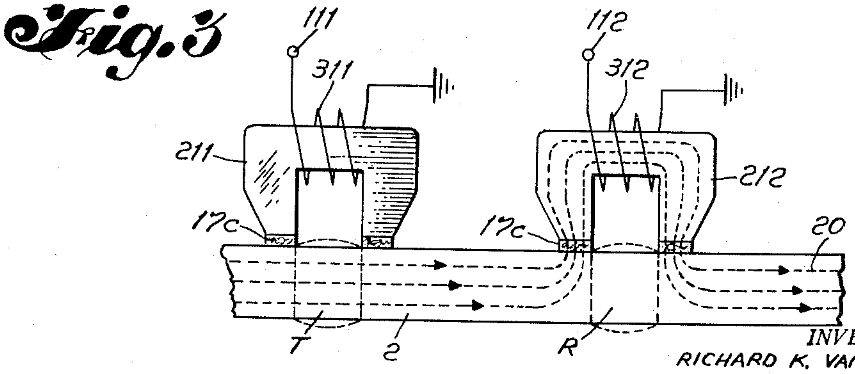
FIG. 3 is an enlarged view in elevation of a portion of the device shown in FIG. 2, with the magnetic flux pattern within this portion diagrammatically shown therein, in accordance with one operative condition associated with this invention.

In order to more clearly illustrate the principles of operation of the device considered in connection with FIG. 2, reference is made to the enlarged view in FIG. 3, wherein a portion of the magnetostrictive delay line 2 of FIG. 2, in the region occupied by the inductive elements 111 and 112, is shown. In this figure, lines of magnetic flux 20 are illustrated by dotted lines and arrow heads pointing in the direction of flux circulation. In the transmitting mode of operation, this flux originates within coil 8 of FIG. 2, circulates through the magnetic member 7 of that figure, and the magnetostrictive line 2. For purposes of illustration it is assumed that a pulse of magnetostriction or constriction has been introduced into the line 2 by means of the coil 3, and the pulse in relation to FIG. 3 is currently contained within the region designated R. In accordance with the foregoing discussion, this pulse will be accompanied by a magnetic variation in the form of an increase in the reluctance of the magnetostrictive line 2 in the region R. This increase in reluctance results in a decreased flux concentration in the interior of the line 2, and a resultant increase in the concentration of flux at the periphery of the line. The resultant increased flux concentration of flux at the periphery, in the region R, of FIG. 3 produces an increased amount of flux coupled to the inductive element 212, as shown, thereby inducing an electrical pulse variation in coil 312, which may be sensed in signal channel 412 connected to terminal 112. Reciprocally, if the system has been established in the receiving mode, electrical energy at terminal 112 is coupled, through coil 312 and magnetic head 212, to the member 2, and as shown in the region R, due to the increased magnetic reluctance in this region, the magnetic flux is shunted through the alternative path, shown in FIG. 2, including the member 2 and magnetic member 7, which in turn is coupled to the coil 8, so as to produce an electrical variation at the output terminal 16, thereof, which variation may be receptively sensed, by means of suitable amplification, in receiver 13 of FIG. 1.

In the region T of FIG. 3, there is no constrictive variation, this variation having progressed to the region R. Accordingly, there will be a decreased amount of coupling between the inductive element 211 and coil 8, which may be discriminatingly rejected by receiver 13. The surprising discovery of this invention is that the variation in inductive couplng, accompanyng a constrictive pulse, is sufficient to permit reliable rejection of signals other than those coupled due to the high reluctance accompanying the constriction. In effect, a propagating constrictive pulse may now be viewed as a moving "opening" or "window" in the line 2, through which signals are transferred. The transferred signals may be varying at a frequency much greater than that associated with the width of the propagating pulse. This should be contrasted to the prior art systems in which the propagating pulse itself represents the information to be transferred between its point of origin and an inductively coupled element.

Figure 4:
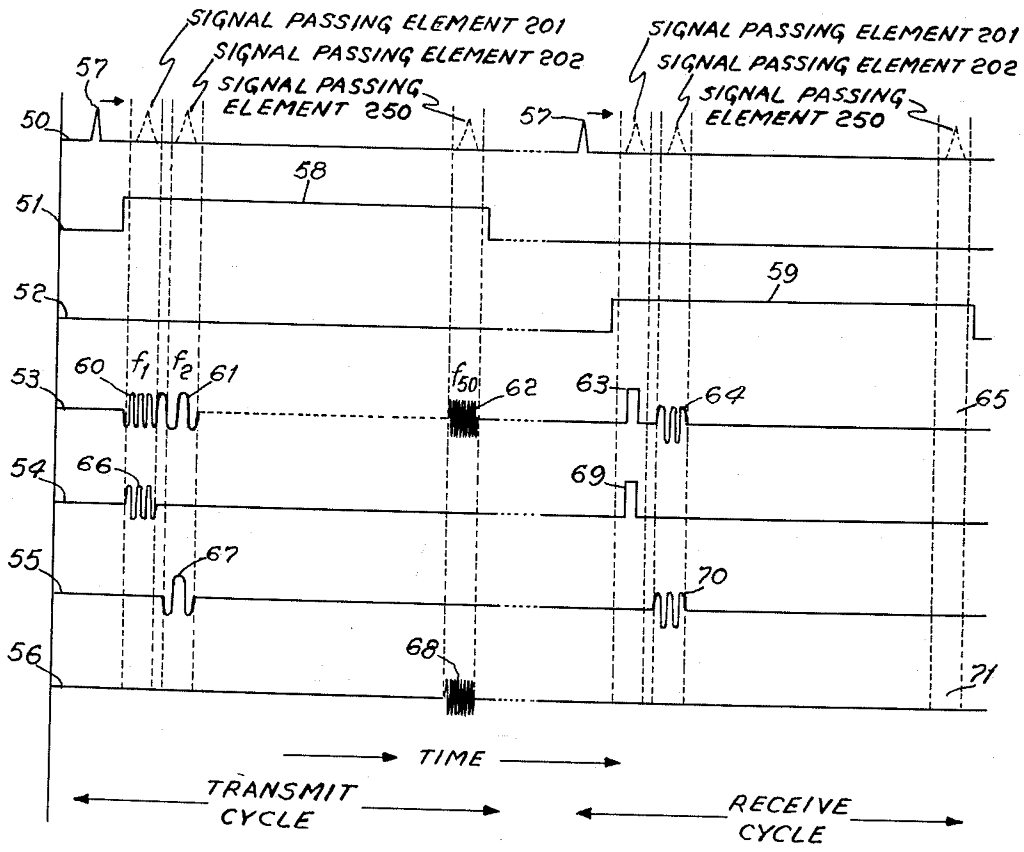
FIG. 4 is a waveform timing diagram illustrating the relationship between the various signals associated with the outputs of the blocks shown in FIG. 1.

Referring to FIG. 4, waveform timing diagrams 50 to 56, inclusive, provide an illustrative set of signalling conditions characterizing the operation of the system shown in FIG. 1. As indicated in the region below waveform 56, the abscissas of all of the waveforms are time axes, with time increasing from left to right in the figure. As further indicated below waveform 56, the time axes are further subdivided into two regions of interest designated transmit cycle and receive cycle, respectively. The term transmit cycle is utilized to characterize the distributive transfer of signals from transmitter 12 to signal channels 401 to 450, and the term receive cycle refers to the multiplexed transfer of signals from channels 401 to 450, to the common receiver 13.

In waveform 50, pulses 57 represent signals on conductor 32 of FIGS. 1 and 2, initiating transfer cycles, the arrows above these pulses defining the direction of propagation. As indicated in this waveform, the dotted pulses represent magnetostrictive disturbances propagating sequentially past inductive elements 201 to 250. Vertical dotted lines bounding the dotted pulses are used to segregate contemporary signal variations at other points in the circuit, these signal variations being illustrated in waveforms 51 to 56 inclusive. Waveforms 51 and 52, respectively, illustrate enabling signals 58 and 59, which serve respectively to activate transmit circuit 12 and receive circuit 13. Enabling signal 58 thereby defines a transmit transfer cycle during which transmitter 12 provides signals, as shown in waveform 53, at terminal 16. In order to illustrate the versatility of the device 1, of this invention, waveform 53 includes signals 60 to 62, inclusive, all differing in frequency. Signal 60, at frequency $f_1$ is transferred to inductive element 201, the output at the associated terminal 101 illustrated as signal 66 in waveform 54. Similarly, signal 61, at frequency $f_2$, is transferred to terminal 102 as shown at 67 in waveform 55, and signal 62 at frequency $f_{50}$ is transferred to terminal 150 as shown at 68 in waveform 56.

Enabling signal 59 defines a receive cycle during which receiver 13, activated by signal 59, shown in waveform 52, receives the combined signal shown in waveform 53, including signal elements 63 to 65 inclusive. Signal elements 63 to 65 are respectively derived from the transfer of signals 69 to 71, inclusive, the latter signals illustrated respectively in waveforms 54 to 56. Signal 69 represents a signal present at terminal 101, of FIG. 1 while a magnetostrictive disturbance is propagating past the corresponding inductive element 201, as shown in waveform 50. Similarly, signals 70 and 71 represent signals present, respectively, at terminals 102 and 150, in coincidence with the passage of the propagating disturbance past the respective elements 202 and 250. The illustrated signals 69 to 71 are shown as radically different signal variations in order to further emphasize the versatility of the invention, signal 71 being shown as a D.C. signal to illustrate the lowest frequency limit in the bandpass of the transfer device under consideration.

In summation, the foregoing discussion of FIG. 4 characterizes the versatility and completely bidirectional nature of the translating device of this invention, the opposing terminals thereof serving interchangeably as input and output terminals.

Figure 5:
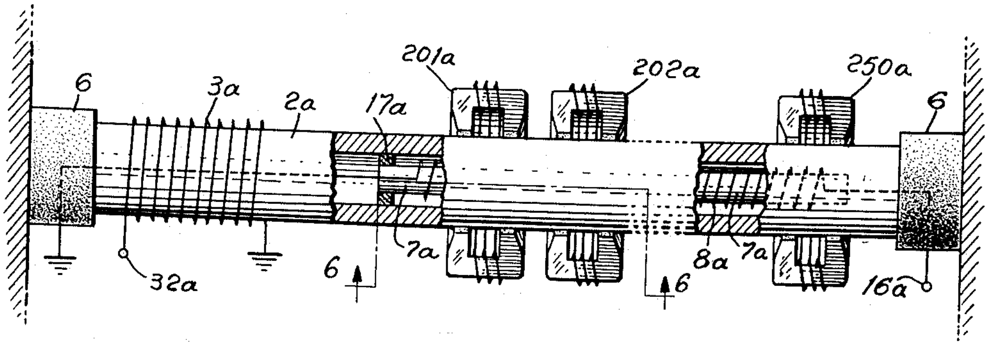
FIG. 5 is a view in elevation, with sections broken away to illustrate the interior, of a second embodiment of a translating device, operating in accordance with this invention.
Figure 6:
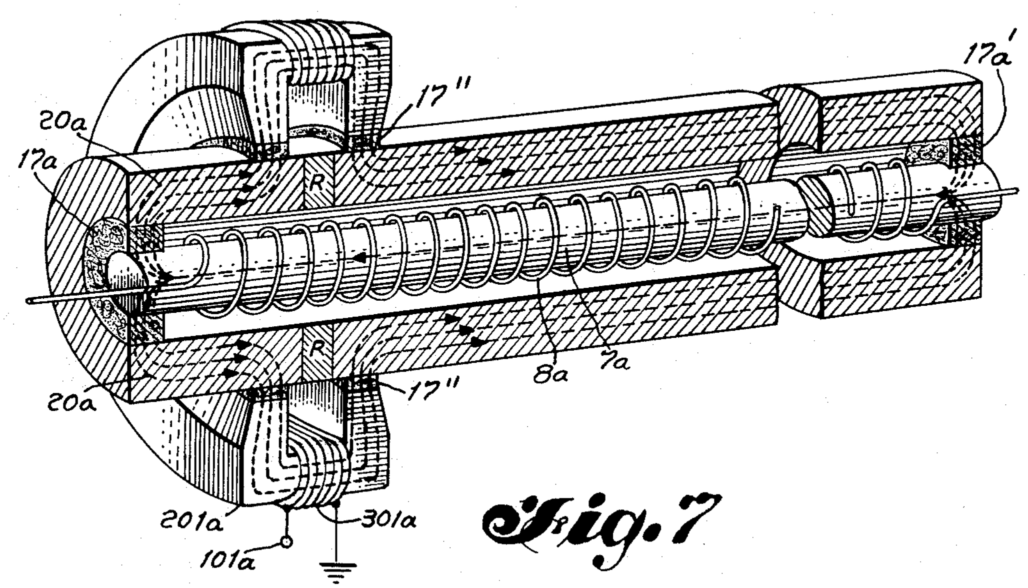
FIG. 6 is a view in perspective of a longitudinal cross-section of the device of FIG. 5.

FIG. 5 is a view in elevation, with exposed interior parts, of a second embodiment operative in accordance with this invention. In this figure, component elements performing the same function as corresponding elements in FIG. 2 are designated by means of the same Arabic numerals, and the subscript *a*. As shown, the magnetic circuit of FIG. 2 including the flux conductive member 7 and the portion of the magnetostrictive line 2, underlying the inductive elements 201 to 250, are more efficiently placed, in this instance, by providing a hollow magnetostrictive line 2*a*, containing within the hollow interior a flux conductive member 7*a*, having a coil 8*a* wound thereon. The ends of the coil 8*a* are respectively connected to ground and a terminal 16*a*, by bringing these ends out to the external region of the member 2, through the damping members 6*a*. The magnetic circuit between the element 7*a* and the line 2*a* is completed by means of steel wool, or other magnetically permeable, nondamping packings 17*a* and 17*a'*. This arrangement is more clearly indicated in the perspective view in longitudinal cross-section of FIG. 6, taken along the line 6—6 of FIG. 5. The functioning of the circuit device shown in FIGS. 5 and 6 is identical to that of the device shown in FIG. 2, with the exception that the magnetostrictive device 2*a*, surrounding the coil 8*a*, acts as a complete magnetic shield between coil 8*a* and the inductive elements 201*a* to 250*a*, in the absence of a propagating pulse of magnetostrictive energy. The advantage of such shielding may readily be appreciated upon consideration of FIG. 2, wherein it is seen that fringing flux emanating from the member 7 may bypass the member 2 and impinge upon the inductive heads 201 to 250, so as to lessen the flux variation occurring when a pulse of magnetostriction passes the region adjacent any given head.

As seen in FIG. 6, the magnetostrictive element 2*a* and magnetic member 7*a* comprise a magnetic circuit completed by the magnetically permeable, nondamping rings of steel wool, 17*a* and 17*a'*, connecting the ends of member 7*a* to the element 2*a*. The member 7*a* may be supported within the member 2*a* by nonmagnetic projecting rods (not shown) connecting the ends of member 7*a* to damping members 6. To simplify the illustration, only one of the inductive elements 201*a* is shown. Element 201*a* is positioned in intimate contact with rod 2*a* by means of a nondamping steel wool ring 17*a''* in a manner similar to the arrangement of FIG. 2. A constrictive pulse is assumed present in the annular region R, and the resultant flux coupling element 201*a* and coil 8*a* is illustrated by means of flux lines 20*a*. Thus, it is seen that the device of FIG. 6 provides a more compact, more efficient and more isolated coupling, between the inductive elements 201*a* to 250*a* and the coil 8*a*, than that provided by the device of FIG. 2.

Figure 7:
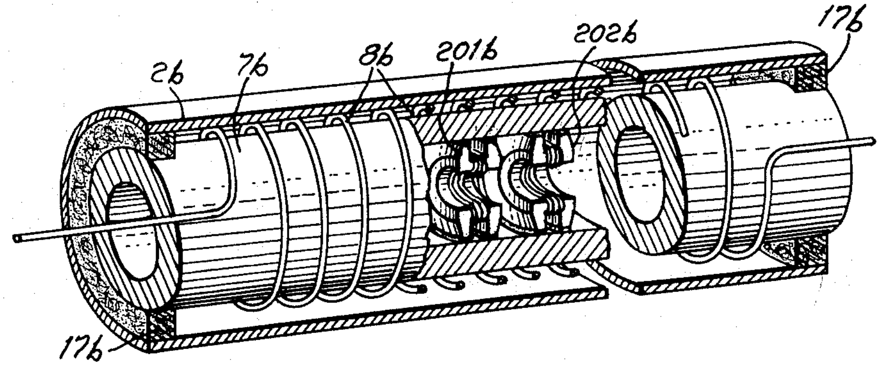
FIG. 7 is a view in perspective of a longitudinal cross-section of a third embodiment of a signal translating device in accordance with this invention.

An alternative embodiment of the device shown in FIG. 5 is seen in FIG. 7, a perspective view in longitudinal cross-section of a magnetostrictive member 2*b*, having a multiplicity of inductive elements 201*b* to 250*b* placed within its hollow interior region, and a single excitation and reception coil 8*b* wound over its exterior portion. Again, the advantage herein in relation to FIG. 2 is the complete shielding between the coil 8*b* and the inductive elements 201*b* to 250*b*, as shown.

Although the inductive elements 201 to 250 in each of the above described figures are specifically described as magnetically permeable cores having coils wound thereon, it should be appreciated that many other inductive components may be coupled by means of this invention. For example, in one form of the invention, elements 201 to 250 may comprise magnetically retentive cores or portions of a magnetically retentive medium, thereby providing a storage and translation device.

Figure 8:
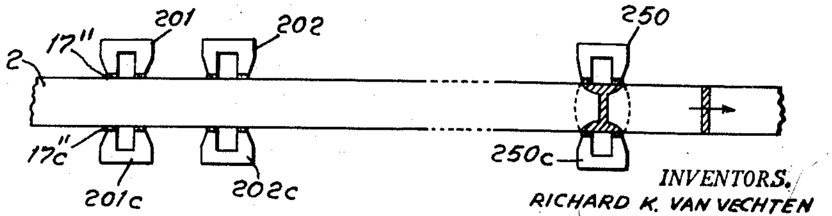
FIG. 8 is a view in elevation of a fourth embodiment of a translating device in accordance with this invention.

FIG. 8 illustrates a third embodiment of the invention wherein a first plurality of inductive elements 201 to 250 and a second plurality of inductive elements 201*c* to 250*c* are arrayed on opposite sides of the member 2 of FIG. 2, so as to permit sequential coupling connections between the opposing elements in response to a propagating constrictive pulse, thereby providing an electronic analogue of a periodically actuated mechanical stepping switch.

In all of the above described devices, it should be noted that signals are bidirectionally coupled through the delay line, thereby providing an additional advantage over prior art electronic signal translation gates, solely capable of selectively translating signals from a unique input terminal to a unique output terminal.

Additionally, it should be noted that the undesired inductive coupling between inductive elements in the absence of a constrictive propagating pulse may be minimized (crosstalk suppression) by conventional balancing techniques, similar to those illustrated on pages 267–268 of "Reference Data for Radio Engineers," 4th edition, IT&T Corporation.

While we have described the principles of our invention in connection with specific apparatus, it is to be clearly understood that this description is provided only by way of example and not as a limitation to the scope of our invention as set forth in the following claims.

We claim:

1. A signal translating device comprising first and second inductive elements, an inductive member having a portion thereof inductively coupled to said first and second elements, said portion normally providing a low reluctance magnetic circuit path inductively isolating said elements, and means for increasing the reluctance of said portion of said member to effect inductive coupling between said elements.

2. A signal translating device comprising first and second inductive elements, an inductive member having a portion thereof inductively coupled to said elements in a relationship such that parts of the flux paths of said elements are in parallel within said portion, and means for increasing the reluctance of said portion of said member to effect inductive coupling between said elements.

3. A signal translating device comprising a plurality of inductive elements, means forming a plurality of magnetic circuit paths with said elements and means coupled to said forming means for sequentially varying said magnetic circuit paths to inductively link predetermined ones of said elements.

4. A signal translating device comprising a plurality of inductive elements, means inductively coupled to said elements, said means normally providing a plurality of preferential flux paths inductively isolating said elements, and means for discretely varying the magnetic reluctance in portions of said coupled means to effect inductive coupling between predetermined ones of said elements.

5. A signal translating device comprising a plurality of inductive elements, a constrictive signal propagating member inductively coupled to said inductive elements and inductively isolating said elements, and means for propagating a constrictive disturbance along said member to thereby vary the inductive coupling between predetermined ones of said inductive elements.

6. A signal translating device comprising a plurality of inductive elements, a constrictive signal propagating member forming a plurality of magnetic circuit paths with said elements, means for inducing a propagating constrictive disturbance in said member, and means disposed in coactive relation with said member for varying said magnetic circuit paths to inductively link predetermined ones of said elements in response to said propagating disturbance.

7. A signal translating device comprising a constrictive signal propagating member, a first magnetic circuit including a flux conductive member and a portion of said constrictive signal propagating member, a first inductive element inductively coupled to said flux conductive member, a plurality of second inductive elements inductively coupled to said signal propagating member through a corresponding plurality of second magnetic circuits and means for propagating a constrictive disturbance along said signal propagating member, to vary the reluctance of said member in regions common to both said first magnetic circuit and each said second magnetic circuit in a predetermined sequence whereby the inductive coupling between said first inductive element and each of said second inductive elements may be sequentially varied.

8. A signal translating device comprising a hollow constrictive signal propagating member having interior and exterior regions, first and second inductive means, one of said inductive means inductively coupled to said member in said interior region and the other of said inductive means coupled to said member in said exterior region, and means for propagating a constrictive disturbance along said member.

9. A signal translating device comprising a hollow constrictive signal propagating member having interior and exterior regions, a first inductive element inductively coupled to said member in said interior region, a plurality of second inductive elements inductively coupled to said member in said exterior region, and means for propagating a constrictive disturbance along said member.

10. A signal translating device comprising a hollow constrictive signal propagating member having interior and exterior regions, a first inductive element inductively coupled to said member in said exterior region, a plurality of second inductive elements inductively coupled to said member in said interior region, and means for propagating a constrictive disturbance along said member.

11. A signal translating device comprising a hollow constrictive signal propagating member having interior and exterior regions, a flux conductive member connected to said signal propagating member at spaced points in said exterior region to provide a flux path therethrough, a first inductive element inductively linking said flux path, a plurality of second inductive elements inductively coupled to said signal propagating member in said interior region between said spaced points, and means for propagating a constrictive disturbance along said signal propagating member to sequentially effect inductive coupling between said first element and each of said second elements.

12. A signal translating device comprising a hollow constrictive signal propagating member having interior and exterior regions, a flux conductive member connected to said signal propagating member at spaced points in said interior region to provide a flux path therethrough, a first inductive element inductively linking said flux path, a plurality of second inductive elements inductively coupled to said signal propagating member in said exterior region between said spaced points, and means for propagating a constrictive disturbance along said signal propagating member to sequentially effect inductive coupling between said first element and each of said second elements.

13. A signal translating device comprising first and second inductive elements, a magnetostrictive signal propagating member providing increased magnetic reluctance in association with constrictive disturbances propagating therein, and having a portion thereof inductively coupled to said elements, said portion normally providing a low reluctance flux path in shunt with and thereby inductively isolating said elements and means for propagating a constrictive disturbance through said portion to inductively couple said elements.

14. A device as in claim 13 wherein said last mentioned means comprises an electromagnetic transducer inductively coupled to said magnetostrictive member and means for applying an electric surge through said transducer.

15. A device as in claim 13, further including resilient damping members supporting and terminating said magnetostrictive member, and wherein at least one of said inductive elements is inductively coupled to said portion of said member through nondamping magnetically permeable fibrous members.

16. A signal translating device comprising a magnetostrictive member providing increased magnetic reluctance in association with constrictive disturbances propagating therein, resilient damping members supporting said magnetostrictive member, a magnetically permeable member, low reluctance fibrous members connecting the ends of said permeable member to said magnetostrictive member at spaced apart points, said permeable and connecting members and the portion of said magnetostrictive member between said spaced apart points thereby providing a complete magnetic circuit, a first inductive element inductively linking said magnetic circuit, a plurality of second inductive elements inductively coupled to said member between said spaced apart points, the magnetic circuit paths provided by said member inductively isolating said first and second elements and means for inducing a propagating constrictive disturbance in said magnetostrictive member to sequentially increase the reluctance in said member adjacent each said second inductive element and thereby inductively couple each said second element in sequence to said first element.

17. A device as in claim 16, wherein said magnetostrictive member includes a hollow portion providing interior and exterior regions, said permeable and fibrous members and said first element are included within said interior region, and said second elements are in said exterior region.

18. A device as in claim 16, wherein said magnetostrictive member includes a hollow portion providing interior and exterior regions, said permeable and fibrous members and said first element are in said exterior region adjacent said hollow portion and said second elements are in said interior region.

References Cited in the file of this patent

UNITED STATES PATENTS

| | | |
|---|---|---|
| 2,740,110 | Trimble | Mar. 27, 1956 |
| 2,790,160 | Millership | Apr. 23, 1957 |
| 2,814,793 | Bonn | Nov. 26, 1957 |
| 2,926,217 | Powell | Feb. 23, 1960 |